Figure 1:
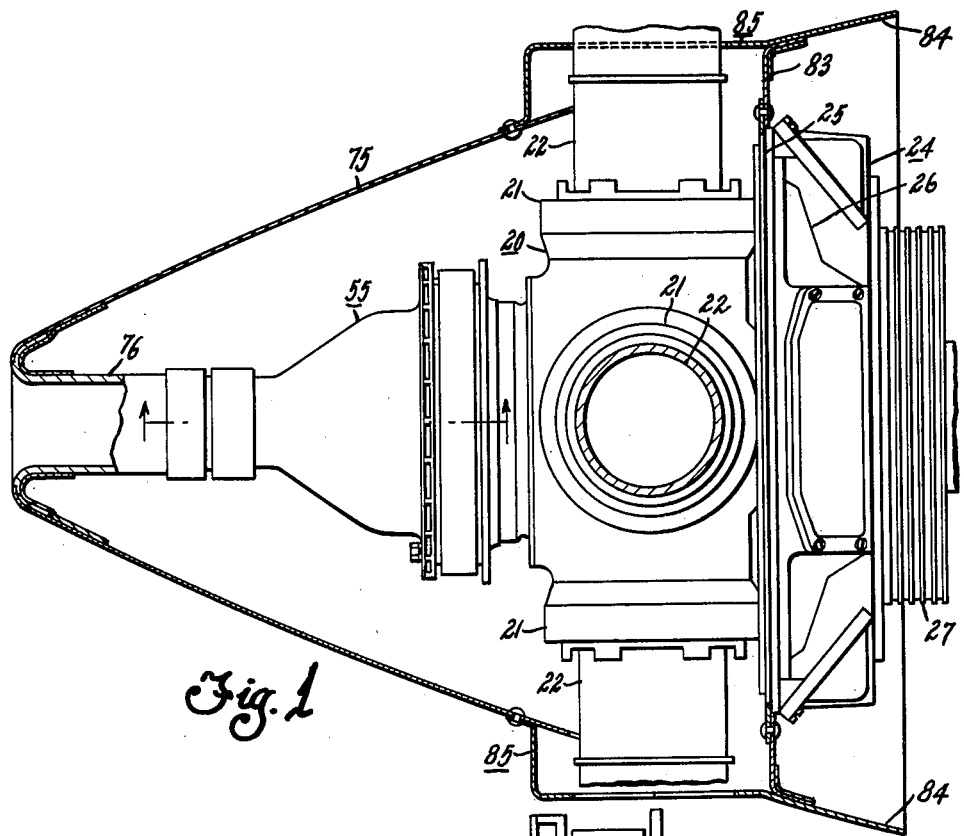

May 28, 1963

R. C. BODEM ETAL 3,091,295

VARIABLE PITCH PROPELLER ASSEMBLY FOR
MULTI-POWER PLANT AIRCRAFT

Original Filed March 19, 1956

4 Sheets-Sheet 1

INVENTORS.
Roy C. Bodem
Roy H. Brandes
Richard A. Hirsch
Edward H. McDonald
Carl F. Wood BY  *G. H. Strickland*

Their Attorney

INVENTORS.
Roy C. Bodem
Roy H. Brandes
Richard A. Hirsch
Edward H. McDonald
Carl F. Wood

BY

M. H. Strickland

Their Attorney

INVENTORS.
Roy C. Bodem
Roy H. Brandes
Richard A. Hirsch
Edward H. McDonald
Carl F. Wood

BY

M. H. Strickland

Their Attorney

United States Patent Office
3,091,295
Patented May 28, 1963

3,091,295
VARIABLE PITCH PROPELLER ASSEMBLY FOR MULTI-POWER PLANT AIRCRAFT
Roy C. Bodem and Roy H. Brandes, Dayton, Richard A. Hirsch, West Milton, Edward H. McDonald, Tipp City, and Carl F. Wood, Dayton, Ohio, assignors to General Motors Corporation, Detroit, Mich., a corporation of Delaware
Original application Mar. 19, 1956, Ser. No. 572,348, now Patent No. 2,986,220, dated May 31, 1961. Divided and this application Aug. 13, 1959, Ser. No. 840,486
7 Claims. (Cl. 170—160.31)

This invention pertains to variable pitch propellers, and particularly to a variable pitch propeller assembly designed for use with gas turbine powered air-craft. This application is a division of Serial No. 572,348, filed March 19, 1956, now Patent No. 2,986,220.

Among our objects are the provision of a variable pitch propeller assembly having a rotatable regulator structure and an independent self-contained fluid reservoir with pumping means for effecting feathering operation of the propeller; and the further provision of a feathering pump reservoir for a variable pitch propeller including pressure development means energized independent of propeller rotation and pressure regulating means therefor for maintaining the output pressure thereof proportional to the speed of propeller rotation.

The aforementioned and other objects are accomplished in the present invention by designing the propeller assembly so that all of the manually adjustable primary control valves are actuated mechanically through linkages from a stationary adapter assembly. Specifically, the propeller assembly includes a hub, which is adapted for connection to the propeller shaft of a turbine. The hub is formed with a plurality of radially extending sockets within which propeller blades are journaled for rotation about their longitudinal axes throughout a range of pitch positions from full reverse to a feathered position. The propeller assembly is generally similar to that disclosed in copending applications Serial No. 485,921, Ditmer et al., now Patent No. 2,891,627, and Serial No. 485,922, Brandes et al., now Patent No. 2,919,752, both filed February 3, 1955, and assigned to the assignee of this invention.

Accordingly, the pitch position of each propeller blade is controlled by a fluid pressure actuated torque unit assembled into each hub socket and enclosed by the hollow root portion of its respective propeller blade. Each torque unit includes a cylinder which rotates upon reciprocable movement of a piston disposed therein, each cylinder being connected to its respective blade through an indexing ring. The pitch positions of the several propeller blades in the hub are coordinated by a master gear which meshes with gear segments formed on the torque unit cylinders, the master gear being journaled in the hub for rotation about the horizontal propeller axis.

A rotating reservoir assembly, or regulator, is attached to the rear of the propeller hub. The regulator assembly contains a quantity of oil for the self-contained hydraulic system and includes a housing, a cover, a slip ring assembly, valve assemblies which rotate with the propeller about a stationary adapter assembly and accessory plate. A plurality of pumps are mounted on the regulator housing, these pumps being energized incident to propeller rotation about the stationary adapter assembly which includes a pump power gear. All of the the control valve assemblies are mounted on the regulator housing, and the hydraulic connections between the valve assemblies and the torque units are formed by tubes and passages formed as an integral part of the regulator housing and the propeller hub. In addition, the major control valves are integrated into unitary valve assemblies which are removable through access openings in the regulator cover. The access openings are closed by plates removably attached to the regulator cover.

The stationary adapter assembly includes, in addition to the pump power gear, a synchronizing lever, a feathering lever, and a control lever. Each lever is connected to a ring gear which effects rotation of a plurality of pinion gears attached to high lead screws. The high lead screws, rotated by each of the three levers, threadedly engage separate axially movable rings disposed within the regulator and slidable on an adapter sleeve, i.e. a control ring, a feathering ring and a speed ring. The control ring of the adapter assembly is operatively connected with the governor valve assembly, as well as the feathering valve assembly The feathering ring is operatively connected to the feathering valve assembly and the speed ring is connected to the speed adjusting means of the governor valve assembly.

A feathering pump and reservoir assembly is attached to the front of the propeller hub and contains an electric motor, a pump drivingly connected to the motor, an oil filler attachment, a feathering pump control valve assembly and a separate reservoir of oil independent of the regulator reservoir. The feathering pump reservoir is air cooled and contains sufficient oil for completely feathering the propeller at all times.

Further objects and advantages of the present invention will be apparent from the following description, reference being had to the accompanying drawings wherein preferred embodiments of the present invention are clearly shown.

Figure 2:
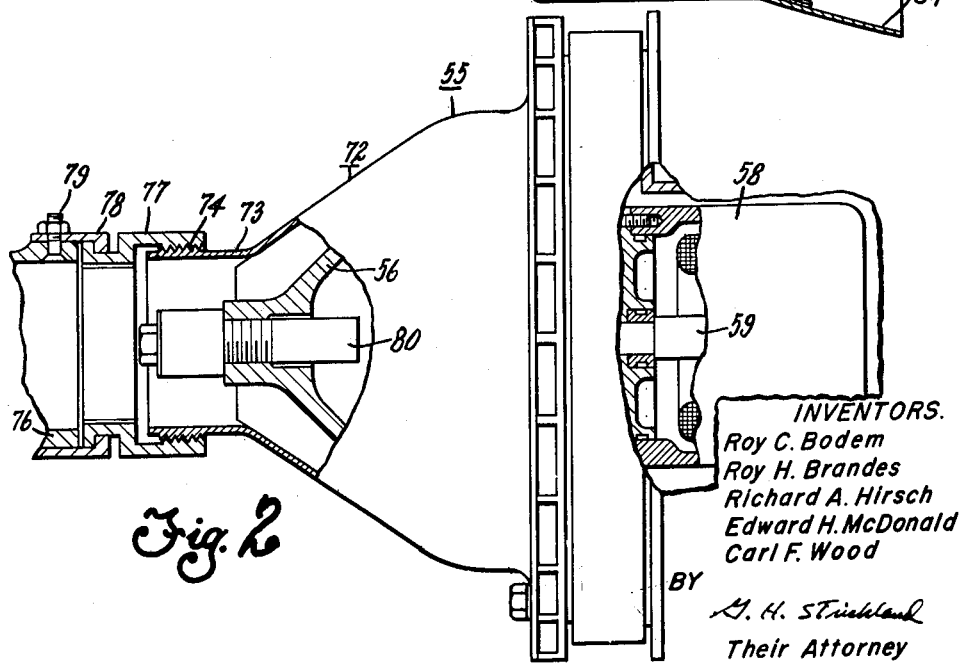
Figure 3:
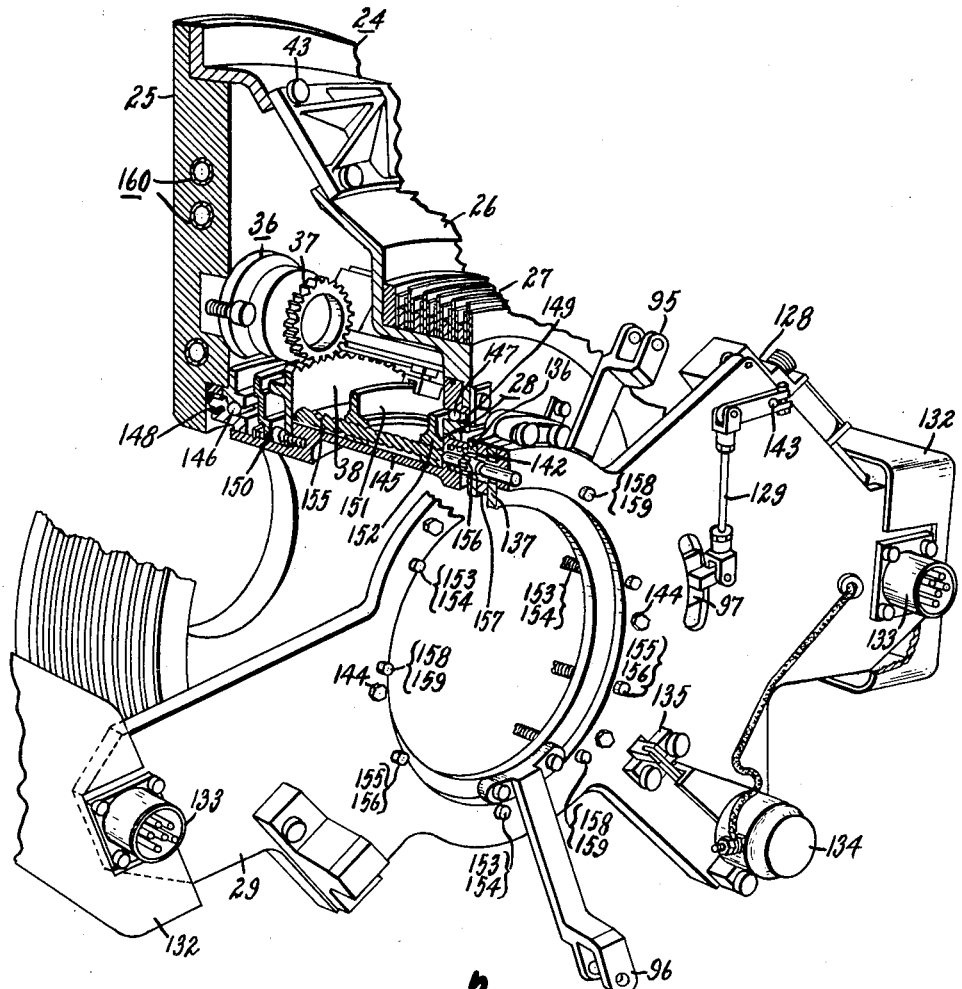
Figure 4:
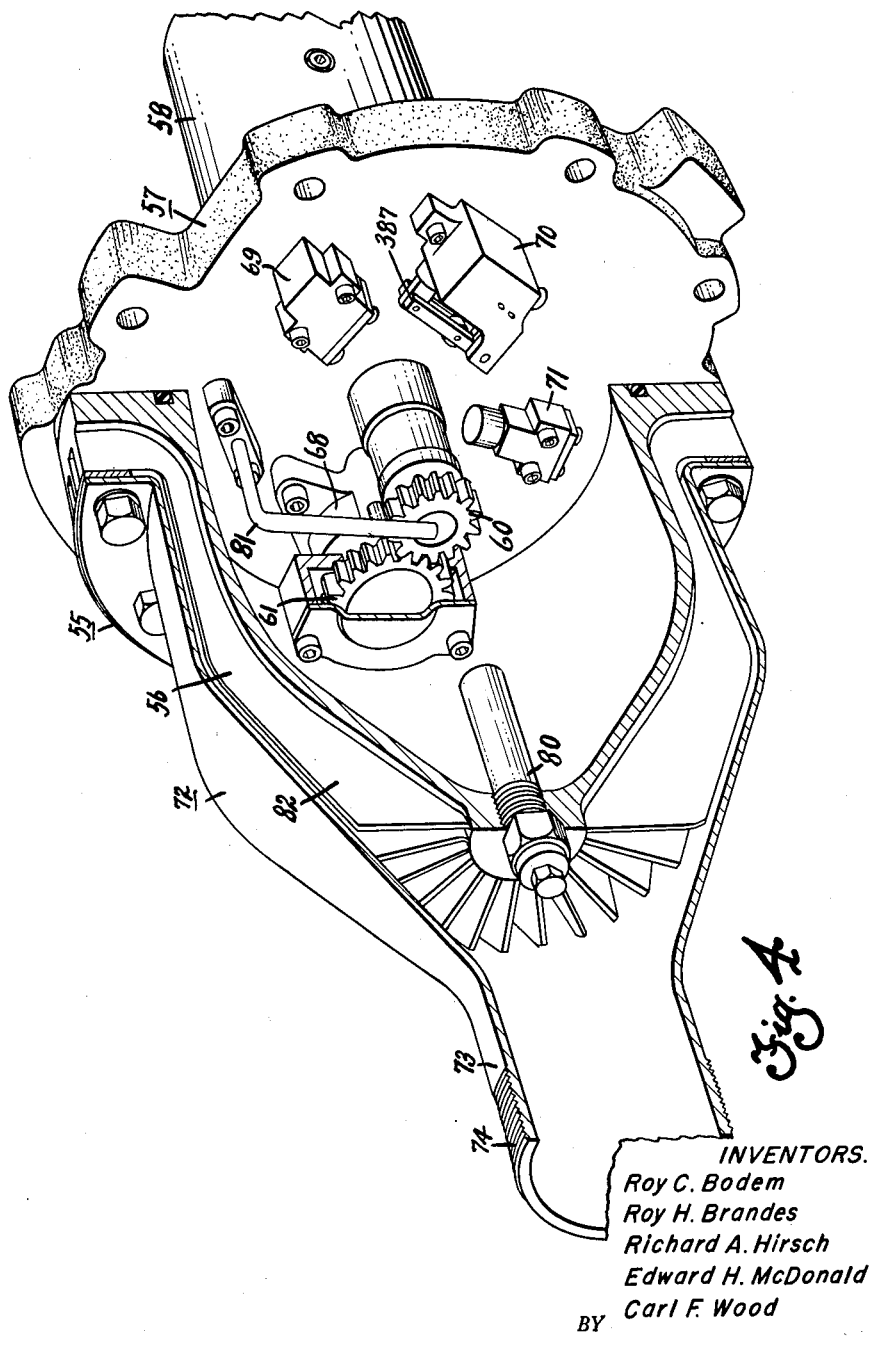
Figure 5:
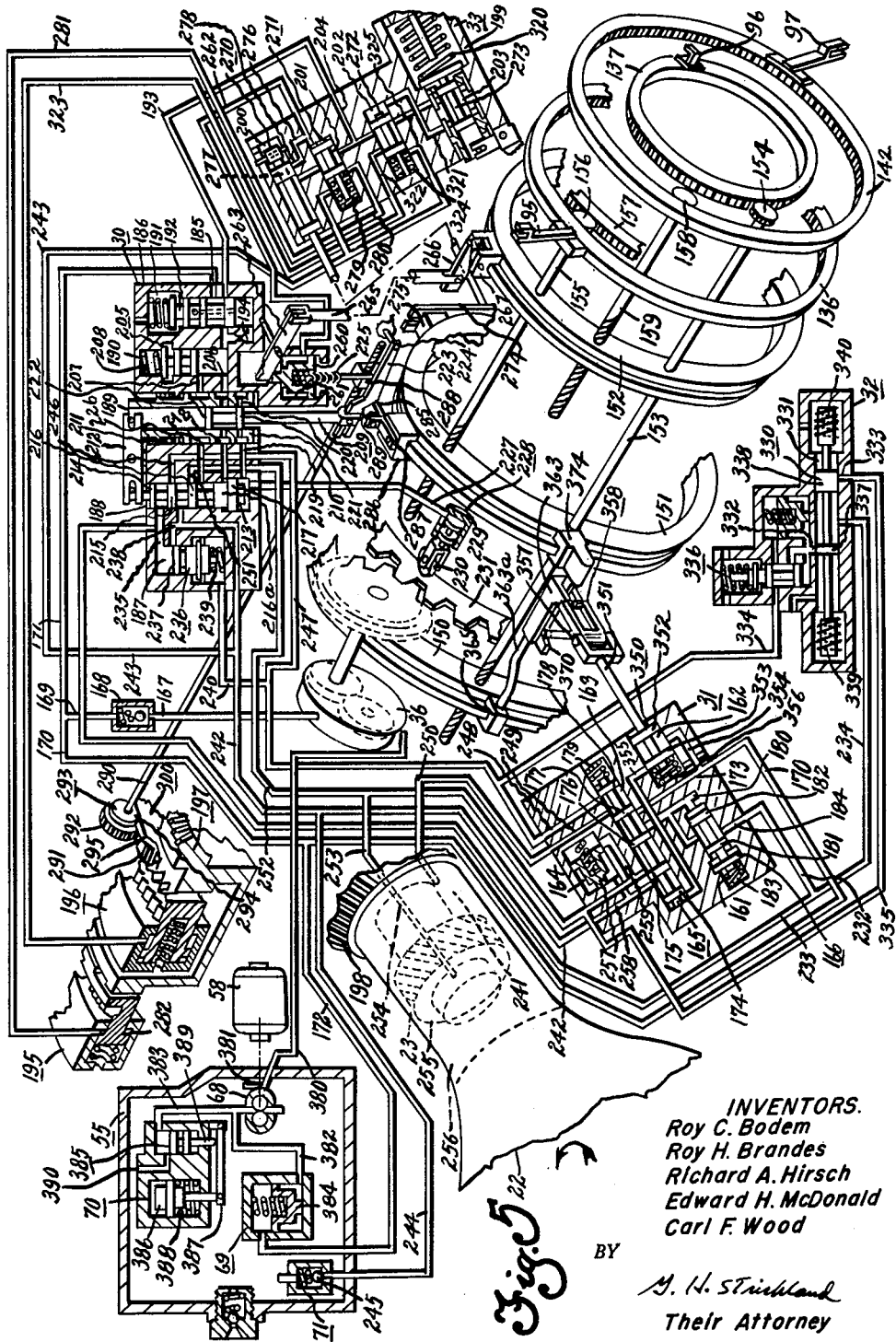

In the drawings:
FIG. 1 is a view, partly in section and partly in elevation, of a propeller assembly constructed according to this invention with certain parts removed.
FIG. 2 is a fragmentary enlarged view, partly in section and partly in elevation, taken generally along line 2—2 of FIG. 1.
FIG. 3 is an isometric view, partly in section and partly in elevation, of the regulator assembly including the stationary adapter assembly and accessory plate.
FIG. 4 is an isometric view, partly in section and partly in elevation, of the feathering pump and reservoir assembly.
FIG. 5 is a view, partly schematic and partly structural, of the propeller hydraulic control system, together with the blade torque unit, hub, and regulator assembly.

With particular reference to FIG. 1, a propeller assembly is shown including a hub 20 having a plurality of radially extending sockets 21 within which propeller blades 22 are journaled for rotation about their longitudinal axes throughout a range of pitch positions from full reverse to full feather. Each propeller blade 22 encloses its own torque unit 23, as shown in FIG. 5, which is assembled into its respective hub socket, the torque units being of the general type disclosed in aforementioned copending application Serial No. 485,921, now Patent No. 2,891,627. The hub is formed with a manifold, or passage means, for conveying hydraulic fluid under pressure from a regulator assembly 24 to opposite sides of the torque units mounted in the hub sockets so as to move the blades 22 in either an increase pitch direction or a decrease pitch direction.

With reference to FIGS. 1 and 3, the regulator assembly includes a housing 25 attached to the rear of the propeller hub so as to rotate therewith, a cover 26 attached to the housing 25 having slip rings 27 thereon, a stationary adapter assembly 28, a portion of which is enclosed by the cover 26 and a stationary accessory plate 29, which is connected to the adapter assembly. Bearing means are incorporated for journaling the regulator housing and cover about the stationary adapter assembly, and the housing, cover and stationary adapter assembly form a doughnut shaped reservoir structure containing hydraulic fluid. In order to prevent the leakage of hydraulic fluid from the reservoir structure, suitable sealing means are disposed between the adapter assembly and the rotatable components of the regulator assembly.

With particular reference to FIGS. 1 and 2, a feathering pump and reservoir assembly 55 is mounted on the front face of the propeller hub 20. As seen in FIGS. 2 and 4, the feathering pump and reservoir assembly comprises a finned cover which is attached to a back plate 57, the back plate being attached to the propeller hub by any suitable means, such as bolts. An electric motor 58 is attached to the back plate 57, the axis of the motor being coincident with the horizontal propeller axis, and the electric motor is disposed within the axial through bore in the propeller hub. The motor 58 includes an armature shaft 59, which extends through the back plate 57 and has attached thereto a pinion gear 60, which engages a pump driving gear 61 of a gear type hydraulic pump 68 mounted on the back plate 57. A check valve assembly 69, a feathering pump pressure control valve 70 and a check valve assembly 71 are also mounted on the back plate 57, as seen in FIG. 4. The finned cover 56 is enclosed by a sheet metal shroud, or shield, 72, the shield 72 being attached to the cover 56. The shield 72 includes an outwardly extending tubular portion 73 having a threaded section 74.

As seen in FIGS. 1 and 2, the propeller hub 20 is enclosed by a one-piece spinner shell 75 having a central opening in the nose thereof, which is formed by a tube 76. This tube is aligned with the tubular portion 73 of the shield 72, and the spinner is secured to the propeller by a retaining nut 77, which engages the threads 74 formed on the shield 72. The nut 77 is secured to the spinner nose tube 76 by an annular coupling assembly 78 which is attached thereto by means of a screw device 79.

The feathering pump reservoir cover 56 carries an oil filler attachment 80 in the nose portion thereof, which may be removed to fill the feathering pump reservoir and the regulator reservoir by means of a pressure filling device, not shown. Hydraulic fluid from the feathering pump reservoir, which acts as a heat exchange device for cooling the hydraulic fluid of the propeller hydraulic system, can flow from this reservoir to the regulator reservoir through a pick-up tube 81, which has an open end at the centerline of the feathering pump reservoir, and communicates with a hub passage, not shown, with the regulator reservoir. Thus, the reservoir 55 is maintained full of oil at all times. As will be pointed out more particularly hereinafter, oil in the feathering pump reservoir is forced to flow through the pick-up tube 81 by drain oil flowing from the regulator control valves and the torque units during propeller rotation. Drain oil under pressure is admitted to the feathering pump reservoir through check valve assembly 71. The feathering pump reservoir is cooled during propeller rotation and flight of the aircraft to which the propeller is attached by reason of air flow through the nose of the spinner which flows in contiguous relation to the cover 56 of the feathering pump reservoir 55. Air flow across the reservoir 55 is aided by the air pump formed by the shield 72 and the fins 82 on the cover.

As seen in FIG. 1, the aft section of the spinner shell 75 is attached to a spinner mounting ring 83, which is bolted to the regulator cover 26. The spinner mounting ring also includes four sections 84 for closing the rear portion of the spinner cutouts through which the propeller blades 22 project. In addition, the spinner assembly includes islands 85 surrounding each spinner cutout, which islands are of two-piece construction. The leading edge portion of each island is attached to the spinner shell 75 and the trailing edge portion of each island is attached to the spinner mounting ring 83. Cooling air for the feathering pump reservoir 55, which flows through the nose of the spinner can escape past the spinner islands around the propeller blade shanks.

With particular reference to FIG. 3, the regulator assembly is shown partly in elevation and partly in section, from which it can be seen that the stationary accessory plate 29 carries brush blocks 132 which are electrically connected to the slip ring assembly 27. Each brush block assembly is electrically connected to a cannon type electric outlet plug 133, by which means electrical energy is supplied to the brush blocks and slip rings. A solenoid 134 capable of actuating an axially movable stop member 135 is supported on the accessory plate 29. The solenoid stop prevents inadvertent movement of the control lever 95 and its associated control gear 136 into the beta range of propeller operation. The solenoid stop can be removed by energizing the solenoid by suitable switch means, not shown, in the aircraft cockpit. The feathering lever 96 is connected with a feathering ring gear 137.

The speed lever 97 is connected with a ring gear 142, which is located in a plane common to that of ring gear 137. The ring gear 137, being of smaller diameter than ring gear 142, is externally toothed, while the ring gear 142 is internally toothed. The speed lever is shown connected by linkage 129 to a shaft 143 of the electric motor 128, the housing of which is attached to the accessory plate 29. As aforementioned, energization of the motor 128 is controlled by the speed synchronizer.

As seen in FIG. 3, the accessory plate 29 is connected by a plurality of bolts 144 to a stationary sleeve 145 of the adapter assembly 28. The stationary sleeve 145 supports bearing means 146 and 147 which journal the regulator housing and cover for rotation about the sleeve 145. In addition, the regulator housing 25 and the cover 26 carry seals 148 and 149, which engage the sleeve 145 so as to prevent the leakage of hydraulic fluid from the reservoir structure.

The pump power gear 38 is shown connected by bolts to the stationary sleeve 145. In addition, three rings are adapted for axial movement on the stationary sleeve 145, namely a feathering ring 150, a control ring 151 and a speed ring 152. The feathering ring engages three high lead screws 153 disposed 120° apart, which high lead screws are driven by pinion gears 154 that mesh with the ring gear 137. Accordingly, upon rotation of the ring gear 137 by means of the feathering lever 96, axial movement will be imparted to the feathering ring 150.

The control ring 151 threadedly engages three high lead screws 155 spaced 120° apart, the high lead screws 155 being attached to pinion gears 156, which mesh with both the ring gear 136 and a synchronizing gear 157. As will be pointed out more particularly hereinafter, rotation is only imparted to the high lead screws 155 throughout a portion of the total movement of the control lever 95 and the ring gear 136 so as to effect axial movement of the control ring 151.

The speed ring 152 is threadedly connected to three high lead screws 158 which are attached to pinions 159 that mesh with the internal ring gear 142 which is attached to the speed lever 97. Accordingly, upon angular movement of the speed lever 97 by the electric motor 128, axial movement will be imparted to the speed ring 152. FIG. 3 also shows a cross-sectional view of the conduit means, or tube insert assembly 160 of the regulator housing 25.

With particular reference to FIG. 5, the propeller hydraulic control system will be described. As aforementioned, four major valve assemblies are mounted on the housing 25 of the regulator. The pumps 36, which are energized incident to propeller rotation, draw fluid from the regulator reservoir and discharge fluid under pressure into a conduit 167. The conduit 167 is connected through a one-way check valve 168 to a high pressure supply conduit 169 constituting part of the tube insert assembly of the regulator housing 25. The conduit 169 is connected to branch conduits 170 and 171. The conduit 170 communicates with a hub passage 172 which connects with the feathering pump reservoir 55, as will be described hereinafter. The conduit 170 also communicates with a passage 173 of the feathering valve assembly 31. The feathering valve assembly 31 includes a casing having valve chambers 161, 162, 163 and 164 therein. The passage 173 communicates with valve chamber 163, in which the spool valve 165 having a plurality of spaced lands 174, 175, 176, 177 and 178, is disposed. The spool valve 165 is normally biased to the position shown by a spring 179. In this position, the passage 173 is connected by the annular groove between lands 176 and 177 with a passage 180. The passage 180 has branches communicating with one end and an intermediate portion of the valve chamber 161 within which a minimum pressure valve 166 is disposed. The minimum pressure valve 166 includes spaced lands 181 and 182 and is normally biased by means of a spring 183 to block communication between the passage 180 and a passage 184 when the propeller is stationary. However, when the pressure developed by the feathering pump is greater than the opposing force of the spring 183, or the propeller is rotating, the valve element 166 will move to the position shown so as to interconnect passages 180 and 184. The function of the minimum pressure valve 166 is to prevent the connection of the high pressure conduit 170 with the passage 184 until the pumps 36 produce sufficient flow under pressure to satisfy the requirements of the low pressure servo system to be described.

The conduit 171 communicates with a passage 185 of the governor assembly 30. The governor assembly 30 includes a casing 186 having five valve chambers 187, 188, 189, 190 and 191, all of which extend in substantially a radial direction from the horizontal propeller axis. A pressure reducer valve 192 is disposed within valve chamber 191 of the governor assembly. The pressure reducer valve 192 is of conventional design and is operative to maintain a substantially constant pressure of approximately 400 p.s.i. in conduit 193 and passage 194. During propeller rotation at the selected speed setting of the governor, the output pressure of the pumps 36 may be on the order of 3600 p.s.i.

The low pressure passage 194 in the governor assembly 30 communicates with valve chamber 190 within which a minimum pressure valve 205 is disposed. When the propeller is rotating, or the pressure below the valve 205 is 400 p.s.i., passage 194 is connected with passages 206 and 207. However, when the propeller is stationary and the pressure in passage 194 is substantially below 400 p.s.i., a spring 208 moves the valve element 205 so as to block communication between the passage 194 and the passage 207. Passages 206 and 207 communicate with valve chamber 189 of the governor assembly within which a speed sensitive valve element 209 and a follow-up sleeve 210 are disposed for reciprocable movement. The sleeve 210 is biased upwardly by a spring 211 and is connected by a link 212 having an intermediate pivot with a distributor valve element 213 disposed in the valve chamber 188. The distributor valve element 213 includes spaced lands 214, 215, 216 and 216a, and a differential area piston 217. The upper surface of the differential area piston 217, as viewed in the drawing, is of lesser area than the lower surface thereof, the difference in area being due to the diameter of the rod which connects the differential area piston 217 with the valve element proper. The smaller area of the differential area piston 217 is always subjected to the 400 p.s.i. servo pressure through a passage 218 that always communicates with the passage 206. The chamber associated with the larger area of the differential piston 217 is connected to a passage 219 that communicates with ports 220 of the sleeve 210.

The speed sensitive valve element 209 is formed with spaced lands 221 and 222, and the rod thereof is pivotally connected at its lower end to a speed sensitive lever 223 pivoted at 224 to the housing 186 of the governor assembly 30. The intermediate portion of the lever 223 is engaged by a governor spring 225. Since the valve chamber 189 is located in a substantially radial direction from the horizontal propeller axis, during propeller rotation, the valve element 209 will respond to the thrust of centrifugal force, which will tend to move it upwardly, as viewed in FIG. 5. The spring 225 opposes upward movement of the valve element 209, and the load of the spring 225 is initially adjusted so that at a preselected speed of propeller rotation, the opposing forces acting on the valve element 209, namely, centrifugal force and the spring force, will be in equilibrium so that the land 221 will close the ports 220. When the land 221 closes the ports 220, the valve element 209 is in the "On Speed" position. Upon an increase in propeller speed above the preselected speed setting, the thrust of centrifugal force will exceed the force of the spring 225 and the valve element 209 will move upwardly, thereby connecting ports 220 to drain. Conversely, upon a decrease in the propeller speed below the preselected speed setting, the force of the spring 225 will exceed that of centrifugal force to move the valve element 209 downwardly, thereby connecting ports 220 with the low pressure passage 206.

The low pressure passage 207 always communicates with a passage 226, which connects with an annular groove between lands 216 and 216a of the distributor valve element 213. In order to maintain the servo actuated distributor valve element 213 sensitive to a change in the pressure of fluid acting on the larger area of differential piston 217, the chamber of the larger area piston surface is connected by a conduit 227 with an hydraulic jitter valve 228 comprising a piston 229 connected to a follower 230, which engages an undulated surface 231 of the pump power gear 38. Thus during propeller rotation, the plunger 230 creates intermittent pressure pulses which serve to impart a slight jitter, or dither, reciprocating movement to the distributor valve element 213.

The high pressure fluid in passage 184 of the feathering valve assembly 31 communicates with a conduit 232 having branch conduits 233 and 234. The branch conduit 233 communicates with a passage 235 in the housing 186 of the governor assembly 30. The passage 235 communicates with valve chamber 188 between the lands 214 and 215 of the distributor valve element 213. In addition, the passage 235 communicates with valve chamber 187 within which a pressure control valve 236 for the high pressure system is disposed. The pressure control valve 236 includes a throttle land 237 which cooperates with a drain passage 238. The pressure control valve 236 is urged downwardly, as viewed in FIG. 5, by the high pressure fluid acting on the upper surface of land 237. In addition, the pressure control valve 236 is urged upwardly by a spring 239, the thrust of centrifugal force and pressure fluid from conduit 240 which communicates with the increased pitch chambers 241 of the torque units, as will be described hereinafter. The pressure control valve 236 maintains a pressure in passage 235, a predetermined potential above that demanded by the increase pitch chambers of the torque units. In other words, the pressure in passage 235 will always be equal to the pressure of fluid in conduit 240 plus the increment of pressure potential equivalent to the force of spring 239 and the thrust of centrifugal force. Any excess in pressure produced by the pump 36 over that maintained in passage 235 and conduits 233 and 234 by the pressure control valve 236 is diverted into the drain passage 238, which communicates with drain conduit 242 connected to branch conduit 243 and a hub passage 244, which communicates through a check valve 245 with the feathering pump reservoir 55. The conduit 242 and the hub passage 244 are always pressurized since the pressure output of the pumps 36 is always in excess of the pressure requirements established by the pressure control valve 236 during propeller rotation at the selected governing speed.

The distributor valve element 213 controls the supply and drain connections of high and low pressure fluid to opposite sides of the propeller torque units at all times except when the feathering valve assembly 31 is actuated. Thus, port 246 associated with the distributor valve is connected to an increase pitch conduit 247, which communicates with a passage 248 of the feathering valve assembly 31. Passage 248 communicates with valve chamber 163 within which the valve element 165 is disposed. When the valve element 165 is in the position shown, the passage 248 is connected with a passage 249 through the annular groove between lands 177 and 178 of the valve 165. Passage 249 is, in turn, connected to a hub passage 250, which communicates with the increase pitch chambers 241 of the torque units.

Port 251 associated with the distributor valve 213 is connected to a conduit 252, which communicates with hub passage 253. The hub passage 253 connects with a transfer tube 254 that extends through the torque unit piston 255 and communicates with the decrease pitch chamber 256 of its respective torque unit. The decrease pitch torque unit chambers 256 are always maintained under a predetermined low pressure, which produces a force on the piston in assisting relation to the centrifugal twisting moment forces effective on the blades 22 during propeller rotation, which combined forces tend to rotate the blades 22 about their longitudinal axes in a decrease pitch direction, as indicated by the arrow in FIG. 5. The predetermined low pressure maintained in the decrease pitch chambers 256 may on the order of 50 p.s.i. as controlled by a decrease loader valve 257 disposed in valve chamber 164 of the feathering valve assembly 31. The decrease loader valve 257 actually comprises a spring loaded check valve, one surface of which is exposed to the pressure maintained in the drain conduit 242, as communicated thereto through passage 258. When the pressure in the decrease pitch chambers 256 of the torque units is less than 50 p.s.i., which pressure is communicated to the other side of the loader valve 257 through conduit 252 and passage means 259, the decrease loader valve 257 will be actuated to interconnect passages 258 and 259, thereby supplying additional fluid under pressure from the drain conduit 242 to the decrease pitch chambers 256.

In the "On Speed" position of the speed sensitive valve 209, the low pressure fluid acting on the upper surface of the differential piston 217 positions the distributor valve element 213 so that the port 246 is slightly open to the high pressure passage 235 and the port 251 is slightly open to drain. Thus, the increase pitch chambers 241 of the torque units are pressurized to exactly balance out the combined forces produced by the centrifugal twisting moments on the blades and the low pressure maintained in the decrease pitch chambers, so that the pitch position of the propeller blades will not change. However, when the speed sensitive element 209 senses an increase in propeller speed above the selected governing speed, the valve element 209 will move upwardly, thereby connecting ports 220 to drain so that the low pressure fluid acting on the upper surface of the differential area piston 217 will move the distributor valve element 213 downwardly, thereby increasing the area of port 251 to the drain passage 238 and increasing the area of port 246 connected to the high pressure passage 235. The distributor valve repositions the sleeve 210 to close ports 220. Accordingly, the increase in pressure in the increase pitch chambers 241 coupled with the connection of the decrease pitch chambers 256 to drain, will cause the blades 22 to rotate in the increase pitch direction so as to increase the load on the turbine and reduce propeller speed to the selected governor speed setting, at which time, the speed sensitive element 209 will move downwardly causing the distributor valve to move upwardly to the "On Speed" position and reposition the sleeve 210 to close ports 220.

Conversely, if propeller speed should decrease below the governor speed setting, the valve element 209 will move downwardly so as to connect ports 220 with the pressure passage 206. In this instance, the increase in pressure on the larger area of the differential piston 217 will move the distributor valve element 213 upwardly so as to connect port 246 to the drain passage 238 and open port 251 to low pressure. When the increase pitch chambers 241 are connected to drain, the constant pressure maintained in the decrease pitch chambers 256 plus the force of centrifugal twisting moments will cause the propeller blades 22 to rotate in the decrease pitch direction so as to again restore propeller speed to the governor speed setting. During movements of the distributor valve plunger 213, the sleeve 210 is moved in a follow-up relation relative to the speed sensitive element 209 through the link 212. In addition, in the absence of any pressure fluid on either side of the differential area piston 217, the spring 211 will move the distributor valve element 213 downwardly to interconnect port 246 with the passage 235 and connect port 251 with the drain passage 238. Since in the extreme downward position of the distributor valve 213, the decrease pitch chambers 256 are connected to drain, and the increase pitch chambers 241 are connected to pressure, the blades 22 will move towards the feathered position.

One end of the governor spring 225 is engaged by a movable abutment 260. In addition, the abutment 260 constitutes a piston responsive to pressure fluid in chamber 261 which is connected to conduit 262. In addition, the abutment 260 is engaged by one end of a lever 263 having an intermediate pivotal mounting to the housing 186. The other end of the lever 263 is pivotally connected to one end of a rod 265. The other end of the rod 265 has a cam 266 attached thereto engageable with a follower shoe 267 which is connected for movement with the speed ring 152. The axial position of the speed ring, and, hence, the load on the governor spring 225 of each slave propeller turbine combination can be adjusted by angular movement of the speed lever through ring gear 142, pinion gears 158 and high lead screws 159.

The feathering valve assembly 31 also includes a feathering control valve element 350, which is disposed for reciprocable movement in valve chamber 162. The feathering control valve element 350 includes a rod 351 and is formed with spaced lands 352 and 353. A branch high pressure passage 354 from passage 173 communicates with the valve chamber 162. In addition, the valve chamber 162 is connected by a passage 355 to the end of the valve chamber 163 within which the servo valve 165 is disposed. The feathering control valve element 350 is biased towards the axis of propeller rotation by a spring 356.

As seen particularly in FIG. 5, the rod 351 has pivotally attached thereto by means of a pin 357 a trolley 358 engageable with cams 363 and 370. The cam 363 is connected by means of a rod 363a with a shoe 365, which can be moved axially by axial movement of the feathering ring 150. When the feathering ring 150 is moved axially to the left due to counterclockwise rotation of the high lead screws 153, which movement is effected by clockwise rotation of the feathering ring gear 137 by the feathering lever 96, the cam 363 will be moved thereby imparting movement to the feathering control valve 351 against the spring 356. The movement imparted to the valve element 351 is sufficient to interconnect passages 354 and 355, thereby causing the application of pressure fluid to the servo valve 165 so that it moves against its spring 179. When the valve 165 moves against its spring 179, the passage 259 is connected to the drain passage 258 through the annular groove between lands 174 and 175 whereby the decrease pitch chambers of the torque units are connected to drain; the land 176 blocks communication between passages 173 and 180 whereby the supply of high pressure fluid to the governor valve assembly is blocked, or interrupted, so as to disable control by the distributor valve 213 over propeller pitch; and the pressure passage 173 is connected to the passage 249 through the annular groove between lands 176 and 177 so as to apply high pressure fluid directly through the hub passage 250 to the increase pitch chambers 241 of the torque units from the high pressure conduit 170. Thus, the servo valve 165 performs three functions, when it is actuated, namely, disables the distributor valve 213 and, hence, the governor from having control over the pitch position of the propeller blades, connects the decrease pitch chambers to drain and connects the increase pitch chambers directly to the high pressure conduit so as to immediately effect movement of the propeller blades towards the feathered position.

In the normal position of the feathering ring 151, the cam 363 is in a position where the spring 356 will position the valve 351 so as to connect passage 355 to drain. In this position, control over propeller pitch is assumed by the distributor valve 213, which is controlled by the valve element 209. Since the valve element 209 is used as a speed sensing element during constant speed operation and as a servo positionable element during beta operation, it is apparent that all necessary propeller functions can be accomplished by a single valve element which controls the distributor valve 213.

With reference to FIG. 5, the feathering pump reservoir is shown connected by a hub pasage 380 with the regulator reservoir. The passage 380 connects with the return tube 381 having an open end at the centerline of the feathering reservoir 55 so as to maintain the feathering reservoir full of hydraulic fluid at all times. As aforementioned, the hydraulic fluid in the reservoir is maintained under a slight pressure, 20 p.s.i., since it only receives flow from the drain hub passage 244 through the check valve 245, which is set to open at 20 p.s.i. The check valve 245 is housed within the check valve assembly 71, which is mounted on the back plate 57, as shown in FIG. 4.

The electric motor driven pump 68 draws fluid from the reservoir 55, when the motor 58 is energized. The motor 58 can be energized through suitable switch means, not shown, by the pilot to adjust the pitch position of the propeller blades when the propeller is not rotating. Under these conditions, the output of the pump 68 will not be connected to the hub passage 172 until the pressure output of the propeller driven pumps 36 is a predetermined amount less than the pressure output of the pump 68. Thus, as seen in FIG. 5, the output of the feathering pump 68 is connected to a conduit formed as an integral part of the back plate 57. The discharge conduit of the pump 68 communicates with branch conduits 382 and 383. Conduit 382 communicates with check valve asembly 69 having disposed therein a spring-biased check valve element 384, which is urged to the closed position by a pressure fluid from hub passage 172. When the pressure in conduit 382 is greater than the combined force of the pressure in hub passage means 172 plus the spring-acting on the check valve element 384, the discharge of the pump 68 will be connected through conduits 381 and 382 to the hub passage means 172.

The feathering pump pressure control valve assembly 70 includes a pressure responsive valve element 385, and a spring-biased centrifugally responsive member 386. The member 386 is pivotally connected to one end of a lever 387, the other end of the lever being pivotally connected to the housing of the valve assembly 70. Since the member 386 is located in a radial direction from the axis of propeller rotation, during propeller rotation, centrifugal force plus the force of the spring 388 will move the lever 387 in a clockwise direction, as viewed in FIG. 9.

The pressure responsive valve member 385 includes a rod 389, which engages the lever 387, and, thus, the thrust of centrifugal force on the member 386 and the spring 388 oppose the pressure of fluid in conduit 383 acting on the valve member 385. Thus, the valve member 385 regulates the pressure of pump 68 and limits the maximum output pressure thereof to 3000 p.s.i. when the propeller is rotating. However, as the speed of propeller rotation decreases, the centrifugal force acting on member 386, likewise, decreases so that the pressure output of pump 68 is reduced proportionally as propeller speed reduces. When the propeller is stationary, the maximum pressure output of the pump 68 is determined by the spring 388. As is apparent, the pressure control valve member 385 determines the pressure output of the pump 68 by controlling the size of a drain port 390.

While the embodiments of the present invention as herein disclosed constitute preferred forms, it is to be understood that other forms might be adopted.

What is claimed is as follows:

1. A variable pitch propeller including in combination, a hub, a plurality of propeller blades journaled in said hub for rotation about their longitudinal axes to different pitch positions, fluid pressure operated motor means carried by said hub and operatively connected with said blades for adjusting the pitch position thereof, a regulator reservoir structure attached to the rear of said hub and rotatable therewith, a feathering pump reservoir structure attached to the front of said hub and rotatable therewith, each of said reservoir structures containing a quantity of fluid, pressure developing means in said regulator reservoir structure and operable incident to propeller rotation, electric motor driven pressure developing means disposed in said feathering reservoir structure, means interconnecting said reservoir structures whereby said feathering reservoir structure is always maintained substantially full of fluid during propeller rotation, conduit means connecting the output of the pressure developing means in both reservoirs, pressure regulating valve means connected to the output of said electric motor driven pressure developing means and responsive to the output pressure thereof, spring biased centrifugally responsive means opposing movement of said pressure regulating valve means whereby said pressure regulating valve means will connect the output of said electric motor driven pressure developing means to said feathering reservoir structure when the pressure potential thereof is above a predetermined value, and spring-biased check valve means operable to connect the output of said electric motor driven pressure developing means to said conduit means when the output pressure potential thereof is higher than the output pressure potential of the pressure developing means in the reservoir regulator structure.

2. In a variable pitch propeller controlled by a fluid pressure system, a feathering pump reservoir rotatable with the propeller and containing a quantity of fluid, pressure developing means disposed in said reservoir operable independent of propeller rotation, and pressure regulating means connected to said pressure developing means for controlling the output pressure thereof comprising a pressure responsive throttle valve and centrifugally responsive means disposed in said reservoir and operatively connected with said valve for opposing movement thereof under the urge of fluid under pressure whereby the output pressure of said pressure developing means will be proportional to propeller speed.

3. In a variable pitch propeller controlled by a fluid pressure system, a feathering pump reservoir rotatable with the propeller and containing a quantity of fluid, pressure developing means disposed in said reservoir operable independent of propeller rotation, and pressure regulating means connected to said pressure developing means for controlling the output pressure thereof comprising a pressure responsive throttle valve, a centrifugally responsive member rotatable with said reservoir, and lever means operatively interconnecting said centrifugally responsive member and said throttle valve for opposing movement thereof by said output pressure whereby the output pressure of said pressure developing means will be proportional to propeller speed.

4. In a variable pitch propeller controlled by a fluid pressure system, a feathering pump reservoir rotatable with the propeller and containing a quantity of fluid, pressure developing means disposed in said reservoir operable independent of propeller rotation, and pressure regulating means connected to said pressure developing means for controlling the output pressure thereof comprising a pressure responsive throttle valve, a centrifugally responsive member rotatable with said reservoir, resilient means acting on said centrifugally responsive member in assisting relation to centrifugal force, and lever means operatively interconnecting said member and said throttle valve for opposing movement thereof by said output pressure whereby the output pressure of said pressure developing means will be proportional to propeller speed during propeller rotation and will be determined by said resilient means when the propeller is not rotating.

5. A variable pitch propeller including in combination, a hub, a plurality of propeller blades journalled in said hub for rotation about their longitudinal axes to different pitch positions, fluid pressure operated means carried by said hub and operatively connected with said blades for adjusting the pitch position thereof, a regulator reservoir structure attached to said hub and rotatable therewith, a feathering pump reservoir structure attached to said hub and rotatable therewith, each of said reservoir structures containing a quantity of fluid, pressure developing means in said regulator reservoir structure operable incident to propeller rotation, pressure developing means disposed in said feathering reservoir structure operable independent of propeller rotation, conduit means interconnecting said reservoir structures whereby said feathering reservoir structure is always maintained substantially full of fluid, conduit means for connecting the outputs of the pressure developing means in both reservoir structures, pressure regulating means disposed in said feathering reservoir structure for controlling the output pressure of the pressure developing means therein, said pressure regulating means being responsive to said output pressure and centrifugal force acting in opposition whereby the output pressure of the pressure developing means in said feathering reservoir structure is proportional to propeller speed, and spring biased check valve means disposed in said feathering reservoir structure and operable to connect the output of the pressure developing means therein to said conduit means when the output pressure thereof is higher than the output pressure of the pressure developing means in the regulator reservoir structure.

6. The propeller set forth in claim 5 wherein said pressure regulating means comprises a pressure responsive throttle valve connected to the output of the pressure developing means in said feathering reservoir structure and a centrifugally responsive member disposed in said feathering reservoir structure and operatively connected to said throttle valve for opposing movement thereof under the urge of the output pressure from said pressure developing means in said feathering reservoir.

7. The propeller set forth in claim 6 wherein the means interconnecting said centrifugally responsive member and said throttle valve comprises a lever, and wherein said centrifugally responsive member is engaged by a spring which acts in assisting relation to centrifugal force whereby said spring will determine the output pressure of the pressure developing means in said feathering reservoir structure when the propeller is not rotating.

References Cited in the file of this patent
UNITED STATES PATENTS

| | | |
|---|---|---|
| 2,427,779 | Haines | Sept. 23, 1947 |
| 2,576,619 | Martin | Nov. 27, 1951 |
| 2,653,669 | Moore et al. | Sept. 29, 1953 |
| 2,691,382 | Frick | Oct. 12, 1954 |
| 2,748,877 | Miller | June 5, 1956 |
| 2,891,627 | Ditmer et al. | June 23, 1959 |